Nov. 6, 1923.  
J. A. LANDIS  
TILTABLE HEADLIGHT  
Filed Jan. 27, 1922

1,472,875

Inventor  
J. A. Landis.  
By C. A. Snow & Co.  
Attorneys

Patented Nov. 6, 1923.

1,472,875

UNITED STATES PATENT OFFICE.

JESSE A. LANDIS, OF EATON, OHIO.

TILTABLE HEADLIGHT.

Application filed January 27, 1922. Serial No. 532,280.

*To all whom it may concern:*

Be it known that I, JESSE A. LANDIS, a citizen of the United States, residing at Eaton, in the county of Preble and State of Ohio, have invented a new and useful Tiltable Headlight, of which the following is a specification.

This invention relates to headlights for motor vehicles, one of its objects being to provide means whereby the two headlights can be simultaneously tilted by the driver so as to change the direction of the light rays when two vehicles are approaching in opposite directions.

A further object is to provide simple mechanism for operating the headlights, this mechanism being installed readily.

With the foregoing and other objects in view which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings the preferred form of the invention has been shown.

In said drawings—

Figure 1:
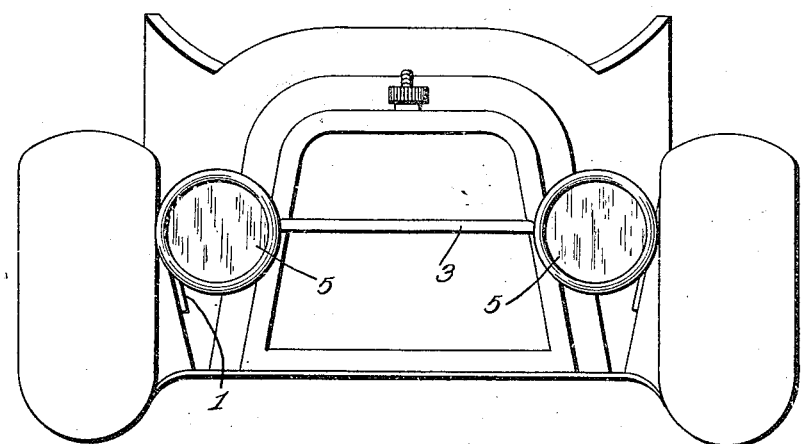
Figure 1 is a front elevation of a portion of an automobile having the present invention combined therewith.

Referring to the figures by characters of reference 1 designates brackets attached to the inner sides of the front guard of an automobile body and mounted in these brackets are bearing studs 2. A connecting bar 3 is arranged in front of the body and is provided at its ends with yokes 4 in each of which is secured one of the headlights 5. The outer ends of the yokes are pivotally mounted on the studs 2.

Pivotally connected to the lower portion of one of the yokes 4 is an operating rod 6 extending through the dash D of the vehicle and attached to a pedal 7. This pedal is pivotally mounted on a bolt 8 extending through a supporting bracket 9. A spring 10 is mounted on the bolt and bears at one end against the bracket 9 and at its other end against a nut 11 on the bolt. This spring thus serves to bind the pedal against one side of the bracket so as to hold the pedal in any position to which it may be tilted.

Figure 2:
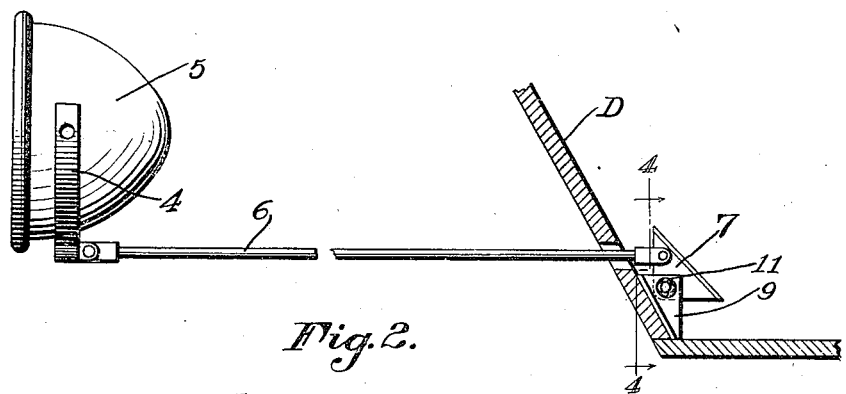
Figure 2 is a side elevation of one of the headlights and its operating means, a portion of the vehicle body being shown in section.
Figure 3:
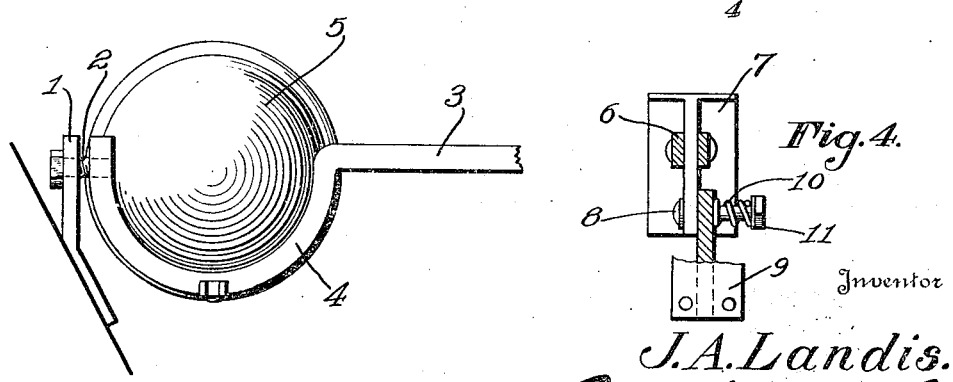
Figure 3 is a rear elevation of one of the headlights and part of its connecting bar.
Figure 4:
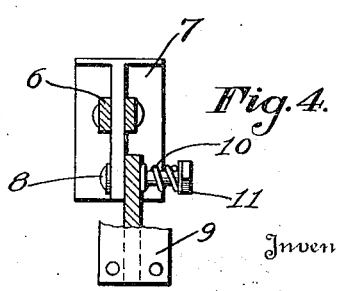
Figure 4 is a section through the operating rod, said section being taken on the line 4—4, Figure 2 and showing the pedal and its bracket, the bracket being partly in section.

It will be apparent by referring to Figure 2 that by pushing forwardly and downwardly on the lower portion of the pedal 7 the rod 6 will be caused to pull on the lower portion of the yoke 4 to which it is attached. Thus the bar 3 will be rotated on the studs 2 and the headlights will be tilted downwardly so as to throw the light rays onto the ground at a desired angle. By pushing forwardly against the upper portion of the pedal 7 the headlights can be swung up to their normal positions. The spring 10 will hold the headlights and the pedal in any positions to which they may be moved.

Obviously by equipping a vehicle with the structure described it becomes possible for a driver to promptly direct the light rays downwardly so as not to blind the driver of an approaching machine and after the cars have passed the headlights can be reset to properly illuminate the path of the machine.

What is claimed is:—

The combination with a vehicle body and brackets connected thereto, a transverse bar, yokes at the ends thereof, pivotal connections between the yokes and brackets, headlights mounted within and movable with the yokes, a pedal pivotally mounted between its ends, a connection between the pedal and one of the yokes for rotating the bar and tilting the headlights simultaneously, to raise or lower them, and adjustable resilient means mounted on the pivot of the pedal for frictionally holding the pedal and the headlights in any positions to which they may be moved.

In testimony that I claim the foregoing as my own, I have hereto affixed my signature in the presence of two witnesses.

JESSE A. LANDIS.

Witnesses:
JOHN W. MORTON,
RILEY PITSINGER.